United States Patent [19]
Walters

[11] 3,940,957
[45] *Mar. 2, 1976

[54] BAR LOCK ASSEMBLY MODIFICATIONS
[75] Inventor: Russell W. Walters, Reading, Pa.
[73] Assignee: BMR Security Products Corporation, Richmond, Ky.
[ * ] Notice: The portion of the term of this patent subsequent to Aug. 6, 1991, has been disclaimed.
[22] Filed: Aug. 6, 1974
[21] Appl. No.: 495,144

Related U.S. Application Data
[63] Continuation-in-part of Ser. No. 277,565, Aug. 3, 1972, Pat. No. 3,827,266.

[52] U.S. Cl. .................................... 70/104; 16/169
[51] Int. Cl.² .......................................... E05B 63/00
[58] Field of Search ............ 70/1, 57, 91, 101, 102, 70/104; 16/147, 169

[56] References Cited
UNITED STATES PATENTS
3,464,241 9/1969 Wellekens ............................ 70/91
3,827,266 8/1974 Walters ................................ 70/104

*Primary Examiner*—Albert G. Craig, Jr.
*Attorney, Agent, or Firm*—Maleson, Kimmelman and Ratner

[57] ABSTRACT

A bar lock assembly secured to opposing door members for constraining the door members each to the other. The bar lock assemblies include a pair of strike plates utilizing the tooth in groove mating concept which have lug members interfacing with each other. A locking mechanism is inserted through bores formed in each of the lug members to secure the strike plates to each other. In one bar lock assembly modification each strike plate includes a tooth member insertable into one of a set of rectangular channels formed in a portion of the periphery of an opposing strike plate lug member. The channels are formed within three surfaces of each lug member to permit the strike plates to be mated in a substantially coplanar manner or perpendicular to each other.

15 Claims, 13 Drawing Figures

BAR LOCK ASSEMBLY MODIFICATIONS

CROSS-REFERENCES TO RELATED PATENT APPLICATIONS

This patent application is a continuation-in-part of my co-pending application Ser. No. 277,565, filed Aug. 3, 1972, now U.S. Pat. No. 3,827,266.

BACKGROUND OF THE INVENTION

1. Field of the Invention

This invention pertains to the field of locking systems. In particular, this invention relates to the field bar lock assemblies utilizing tooth in groove between mating strike plate and lug members.

2. Prior Art

In my copending patent application above referenced, there is disclosed bar lock assemblies utilizing tooth in groove interface between mating strike plates and lug members. Bar lock assemblies of this nature have been found to provide increased structural integrity against external attack and thus shown significant advantages over prior art bar lock assemblies. However, I have now developed additional improvements in the basic tooth in groove bar lock assembly concept to further diminish the possibility of successful external attack. For particular applications, the contour of the strike plates provides for flush contact between the bar lock assembly and the door members to which it is secured. This removes an area within which a prying tool may be inserted between the door members and the lock assembly thus resulting in a reduced possibility of successful external attack. In other positions, the tooth member interface area with the groove sidewalls has been increased.

For other applications, it is desirable to specially reduce the cost of fabrication while maintaining as far as possible the structural integrity and security.

SUMMARY OF THE INVENTION

A locking bar assembly comprising a pair of strike plates having respective lug members formed on each of the strike plates. A bar lock mechanism is insertable through bores formed within each of the lug members when the bores are aligned in a predetermined direction. Each of the lug members has an upper and lower surface passing in a plane substantially normal to an axis direction of the bores. Additionally, each lug member includes an outer side surface having at least one larger dimension section and at least one smaller dimension section. At least one first mating element is formed by at least one of the strike plates and at least one second mating element is formed on and is shorter than the outer side surface of each lug member. The first mating element of one of the strike plates and the second mating element of the lug member of the other strike plate are received in the other when the bores are aligned in the predetermined direction. The first and second mating elements are formed to define at least one angular substantially fixed position between the strike plates.

BRIEF DESCRIPTION OF THE DRAWINGS

FIG. 12 is a sectional view of the bar lock assembly embodiment partially cut-away and taken along the section line 12—12; and, FIG. 13 is a perspective exploded view partially cut-away of the bar lock mechanism insertable in one of the lug members of the strike plates of the bar lock assembly embodiment.

DESCRIPTION OF THE PREFERRED EMBODIMENTS

Referring now to FIGS. 1–8, there is shown improved bar lock assebmly or locking system 10 for constraining opposing movable section elements or door members 12, 14. The bar lock modifications as herein detailed include improvements to the basic tongue in groove concept for bar lock assemblies developed in my co-pending patent application Ser. No. 277,565, filed Aug. 3, 1972. Each of strike plates 16, 18 of assembly 10 are securely mounted to respective section elements 12, 14 in a manner such that upon interface of opposing strike plates 16, 18 in angularly predetermined fixed positions, bar lock mechanism 20 may be inserted through lug or lug members 28, 30 of each strike plate 16, 18. In this manner, door members 12, 14 are constrained each to the other along door member interface 24. Bar lock mechanism 20 is similar to the lock mechanism shown and described in my copending patent application Ser. No. 403,460, filed Oct. 4, 1973.

Figure 1:
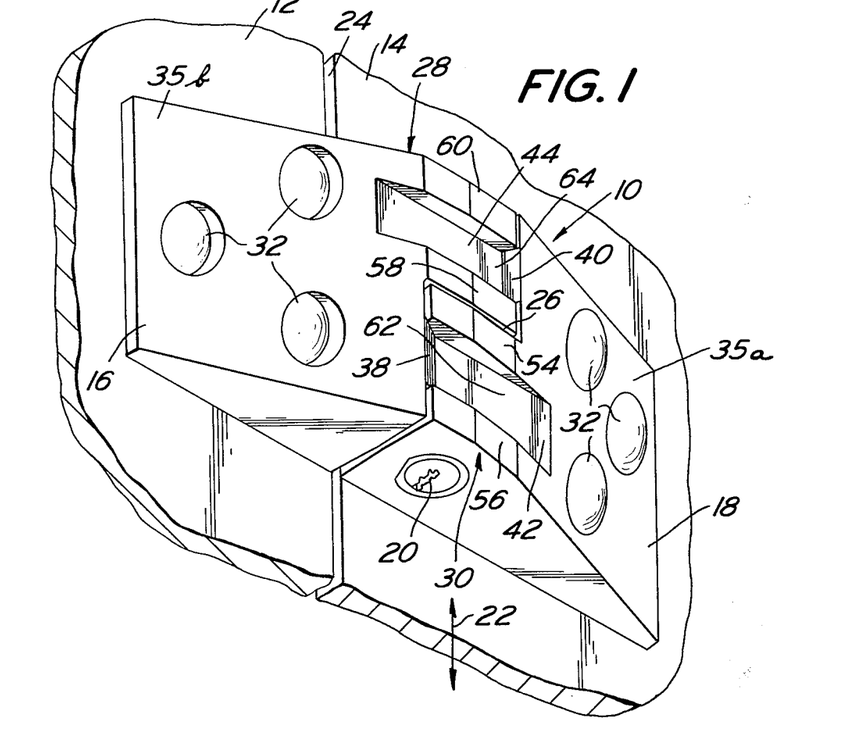
FIG. 1 is a perspective view of one bar lock assembly modification secured to a pair of door members.
Figure 2:
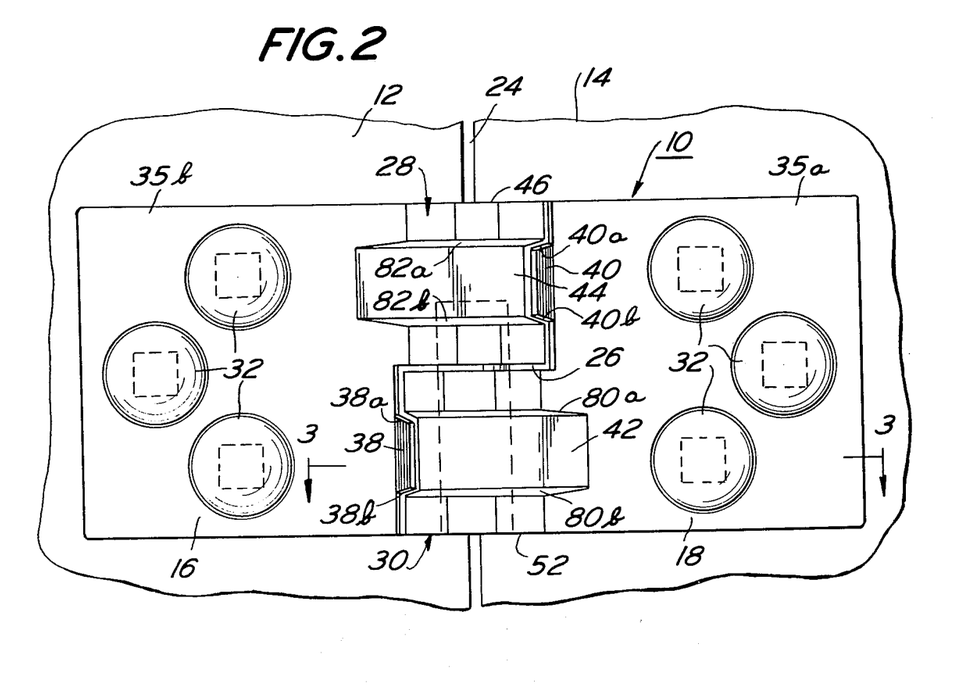
FIG. 2 is an elevation view of the bar lock assembly shown in FIG. 1.
Figure 3:
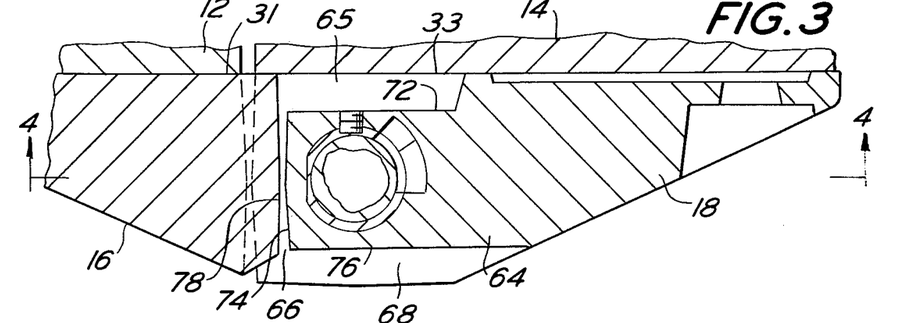
FIG. 3 is a sectional view of the bar lock assembly, partially cut-away, taken along the section line 3—3 of FIG. 2.
Figures 7, 8, 10:
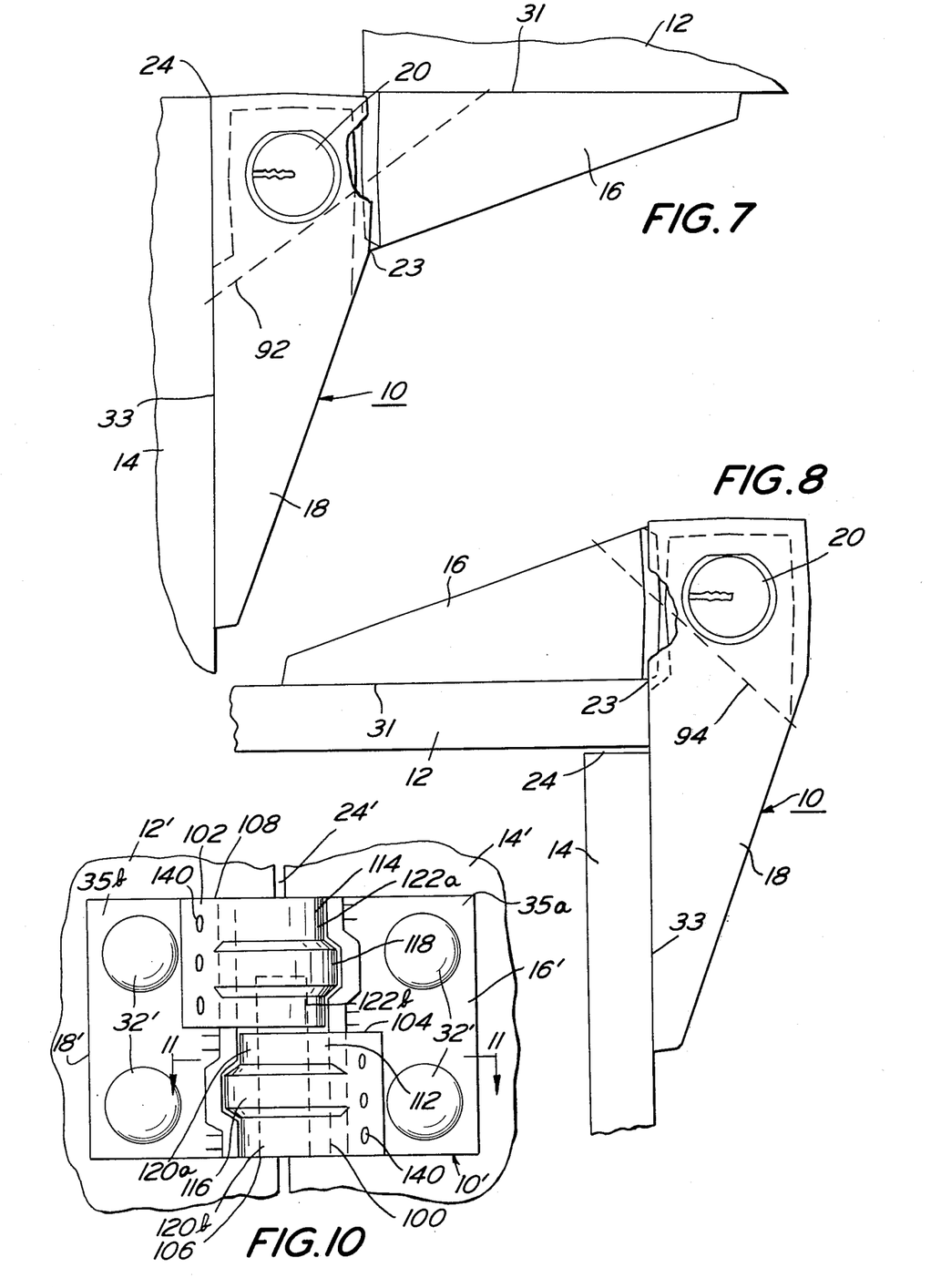
FIG. 7 is a plane view of the bar lock assembly mounted to respective door members in an inside mount position.
FIG. 8 is a plane view of the bar lock assembly mounted to respective door members in an outside mount position.
FIG. 10 is an elevation view of the bar lock assembly shown in FIG. 9.

Bar lock assembly 10 may be mounted to door members 12, 14 in three separate and distinct configurations. Lock assembly 10 may be mounted in a door member coplanar contour as shown in FIG. 1 where elements 12 and 14 form a substantially coplanar arrangement. Additionally, system 10 may be secured in an inside mount, or outside mount as shown in FIGS. 7 and 8 respectively where door members 12 and 14 describe planes which are substantially perpendicular to each other. The fixed interface or mating positions of strike plates 16, 18 is dictated by the fact that interface is predicated by the insertion of first mating elements 38 or 40 on one strike plate 16 or 18. The rectangularly contoured channels 65, 66 and 68 are formed in three surfaces of lug members 28, 30 as is shown in FIG. 3. When elements 38, 40 are inserted in channel 65, a flush or coplanar mount is provided as shown in FIG. 1. When first mating elements 38, 40 are insertable in upper rectangular channel 65, an inside mount is formed as is shown in FIG. 7 and when they are inserted in lower channel 68, an outside mount is formed as is shown in FIG. 8.

Each of strike plates 16, 18 forms a substantially triangular contour in a plane normal to directional arrow 22. A substantially linear base surface of plates 16, 18 lies flush with members 12, 14 as is shown in FIGS. 1 and 3.

Thus, as a result of the construction of assembly 10, there is provided a substantially mating, flush contact between strike plates 16 and 18 and movable door members 12, 14 throughout interface plane 31 and 33 shown in FIG. 3. This substantially continuous contacting surface interface reduces the possibility of insertion of a chisel or other torqueing device behind assembly 10 to pry strike plates 16 and 18 from door elements 12 and 14 when they are mounted each to the other. Additionally, assembly 10 provides for low clearance dimensions along the interface between opposing mating elements of strike plates 16, 18 when they are positionally located in secured engagement. This prevents insertion of prying tools between strike plates 16 and 18 and reduces the possibility of strike plates 16 and 18 being pried one from the other. Further, it will be shown that where a torqueing tool is inserted at interface 26 between lug members 28 and 30, the force applied is transferred not only to bar lock mechanism 20 but is further resisted by strike plates 16, 18 in themselves, which has the resulting effect of increasing the load factor which system 10 can accommodate when being externally attacked. Additionally, when mounted as shown in FIGS. 7 and 8, an interlock condition is promoted at section 23 where opposing strike plates 16 and 18 interleave with themselves to prevent insertion of a prying tool.

In general, improved locking system 10 includes strike plates 16, 18 having lugs 28, 30 formed thereon. Each of strike plates 16, 18 is secured to a respective door member 12, 14 in a manner such that lugs 28, 30 may be aligned in substantially a direction defined by directional arrow 22 as well as being mounted each to the other in predetermined angularly fixed positions as is illustrated in FIGS. 1, 7, and 8. Bar lock mechanism 20 is insertable through aligned lug members 28, 30 in order to maintain constrainment between section elements 12 and 14.

Strike plates 16, 18 are substantially formed in an "L" shaped configuration having respective lug members 28, 30 formed thereon. Lug members 28, 30 form the base portion of the "L" shape configuration and are mated to each other in an inverted manner. Each of strike plates 16, 18 are mounted to respective movable section elements 12, 14 through a plurality of bolts, screws, or some like securement means being passed through openings 32. In this manner, strike plates, 16, 18 are securely mounted to respective elements 12 and 14. Plates 16, 18 are interfaced each with respect to the other or mated such that lugs 28 and 30 are aligned in a predetermined direction substantially defined by the orientation of directional arrow 22. Additionally, plates 16, 18 are interfaced each with respect to the other in one of the angular positional relations defined in FIGS. 1, 7 or 8. Each of lugs 28, 30 describes a base element of plates 16, 18 and are formed in one piece constructions with vertically directed frame sections 35a, 35b of the respective strike plates 16 or 18.

Each of strike plates 16, 18 are releasably secured to each other through a combination of the insertion of mechanism 20 and interaction of first mating elements 38, 40 formed on strike plates 16, 18 with second mating elements 42, 44 formed within lug members 28 and 30. As can be clearly seen in the figures, this combined element interaction serves to transfer load stresses incurred at interface 26, or other strike plate interface areas to the structural components of strike plates 16, 18 instead of the load being directly transmitted to bar lock mechanism 20. Thus where a tool is inserted at interface 26 or within other plate interfaces, elements 38, 40 bear against second mating elements 42, 44 to absorb some of the stress load applied to lock mechanism 20.

First mating element 38 or 40 forms a tooth member which is constructed integral with a side surface of vertical frame plate 35 of each of strike plates 16, 18. As is seen, first mating or tooth elements 38 and 40 extend in substantially a normal direction with respect to orientation direction 22 and each is insertable within respective second mating elements or channel elements 42, 44. Each of lug members 28 and 30 include upper and lower surfaces 46, 48 and 50, 52 respectively which pass in a plane substantially normal or perpendicular to the axis direction of bores 34, 36 shown in FIGS. 4 and 5. Lug members 28 and 30 include an outer side surface having a pair of larger dimension sections 54, 56 and 58, 60 with at least one smaller dimension section 62 and 64. Looking at lug member 30, it is seen that second mating element 42 is thus formed by larger dimension sections 54, 56 in conjunction with smaller dimension section 62 to provide a substantially planar rectangular area where first mating element 38 may be inserted.

Figure 4:
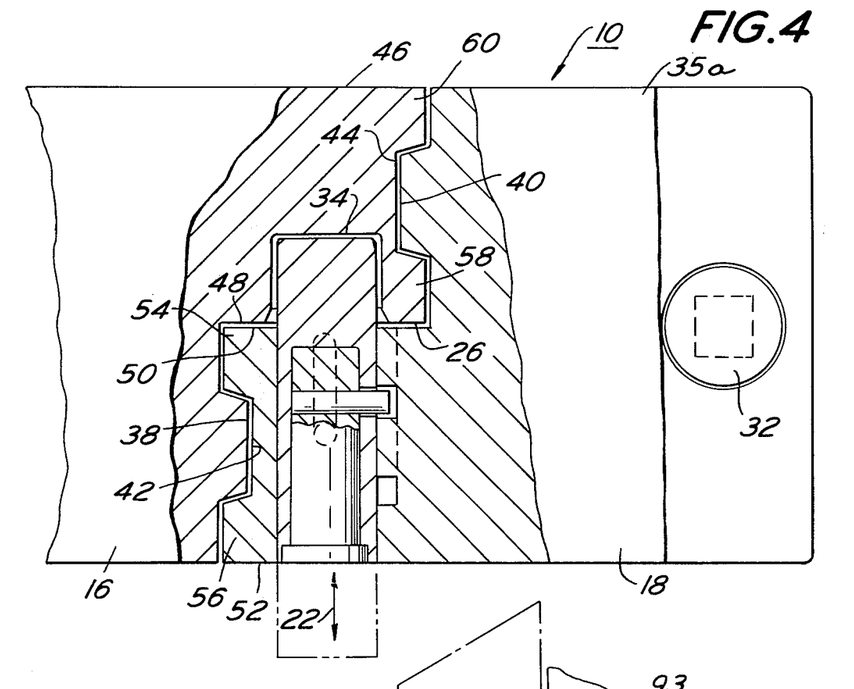
FIG. 4 is a sectional view of the bar lock assembly, partially cut-away and taken along the section line 4—4 of FIG. 3.

As is seen in FIG. 4, smaller dimension section 62 passes around each of lug members 28 and 30 throughout a portion of its periphery. Thus, there is formed on each of lug members 28 and 30, channels 65, 66 and 68 within which first mating element 38 or 40 may be inserted when strike plates 16, 18 are mated each to the other in a predetermined angular position as is defined by FIGS. 1, 7 and 8. As is shown in FIG. 1, strike plates 16, 18 may be mounted or mated each to the other in a coincident planar manner where first mating element 38 is insertable within channel 66. Further, as is shown in FIG. 7, inside mounting may be accomplished where first mating element 38 is insertable within rectangular channel 64 or a third position for interfacing strike plates 16, 18 may be provided as is shown in FIG. 8, where strike plates 16 and 18 are mounted in a manner that first mating element 38 is insertable within rectangular channel section 68.

As is seen in FIG. 3, base surfaces 72, 74 and 76 of corresponding channels or grooves 65, 66 and 68 extend in a substantially linear direction around the periphery of reduced dimension sections 62 and 64. However, each base surface may have very slight curvature to provide allowance for small angular perturbations of respective strike plates 16, 18 when such are mated each to the other. Further, first elements 38 and 40 formed in a side surface of frame elements 35a-b, extend in a substantially linear direction but also may include a partially or slightly curved surface 78 to permit slight angular perturbations between strike plates 16 and 18 when such are interfaced each with respect to the other. This may be of importance when door members 12 and 14 are slightly misaligned with respect to each other and/or strike plates 16 and 18 are not exactly in a preferred alignment position.

Channels 65, 66 and 68 having respective base surfaces 72, 74 and 76 extend throughout a portion of each lug 28, 30 peripheral boundary as is shown in FIG. 3. Second mating elements 42 and 44 include opposing sidewalls 80a–b and 82a–b to provide respective channel depths substantially equal to but slightly greater than the depth of respective tooth elements 38 and 40. Due to the substantially linear extension of teeth 38 and 40 as well as the coacting substantially linear contour of the channel sections of second mating elements 42 and 44, it is clearly seen that interfacing or mating of strike plates 16, 18 each with respect to the other prevent substantial rotation of plate 16 and 18 about directional arrow 22.

Additionally, the interfaces between tooth elements 38 and 40 and the opposing channel elements 42 and 44 are formed to provide approximately 3/64 of an inch clearance at interface planes. The clearance between lugs 28 and 30 and opposing vertical frame members 35a, 35b is also in the clearance range of 3/64 of an inch. This small clearance reduces the possibility of insertion of a prying tool for removal of one strike plate from the other.

Where external attack forces are applied at interface 26 through a lever or chisel, there is usually applied a torqueing force which tends to displace lugs 28 and 30 away from each other in a direction coincident with directional arrow 22. In such an instance, first and second mating elements 38, 42 and 40, 44 provide reaction forces when sidewalls 80a, 80b and 82a, 82b contact tooth elements 38 and 40. Thus, the external attack force is transmitted to strike plate 16, 18 as well as associated lug members 28, 30 and substantially alleviates or disperses any force stress directly applied on bar lock mechanism 20. Additionally, second mating element sidewalls 80a–b and 82a–b may be inclined to interface with first element inclined sidewalls 40a–b and 38a–b to provide increased shear area to accommodate larger torqueing forces.

In this manner, reaction forces responsive to external attack torqueing forces, are substantially taken up by structural integrity for the improved locking system 10. Further, when locking system 10 is applied to door members 12, 14 in positional arrangement defining an inside or an outside mount as shown in FIGS. 7 and 8, sawing action to remove one strike plate from another must pass along sawing lines 92 or 94 which provides an increased cutting area thereby causing difficulty in permitting structural dismemberment. The inside mounting position, shown in FIG. 7 provides for additional structural advantages where it is seen that interface 26 shown in FIG. 1, diminishes considerably in its extended length. This has the effect of reducing the lock assembly areas where a prying tool may be inserted.

Figure 5:
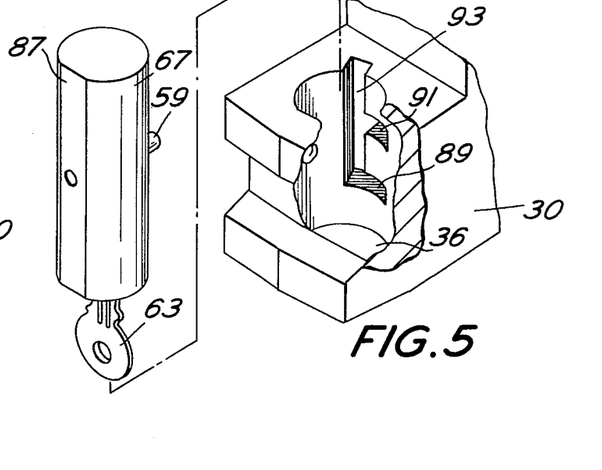
FIG. 5 is a perspective exploded view in partial cut-away of the bar lock mechanism insertable in one of the lug members of the strike plates of the bar lock assembly.
Figure 6:
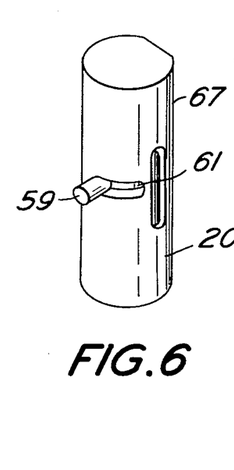
FIG. 6 is a perspective view of the bar lock mechanism taken along a different view line than that shown in FIG. 5.
Figures 12, 13:
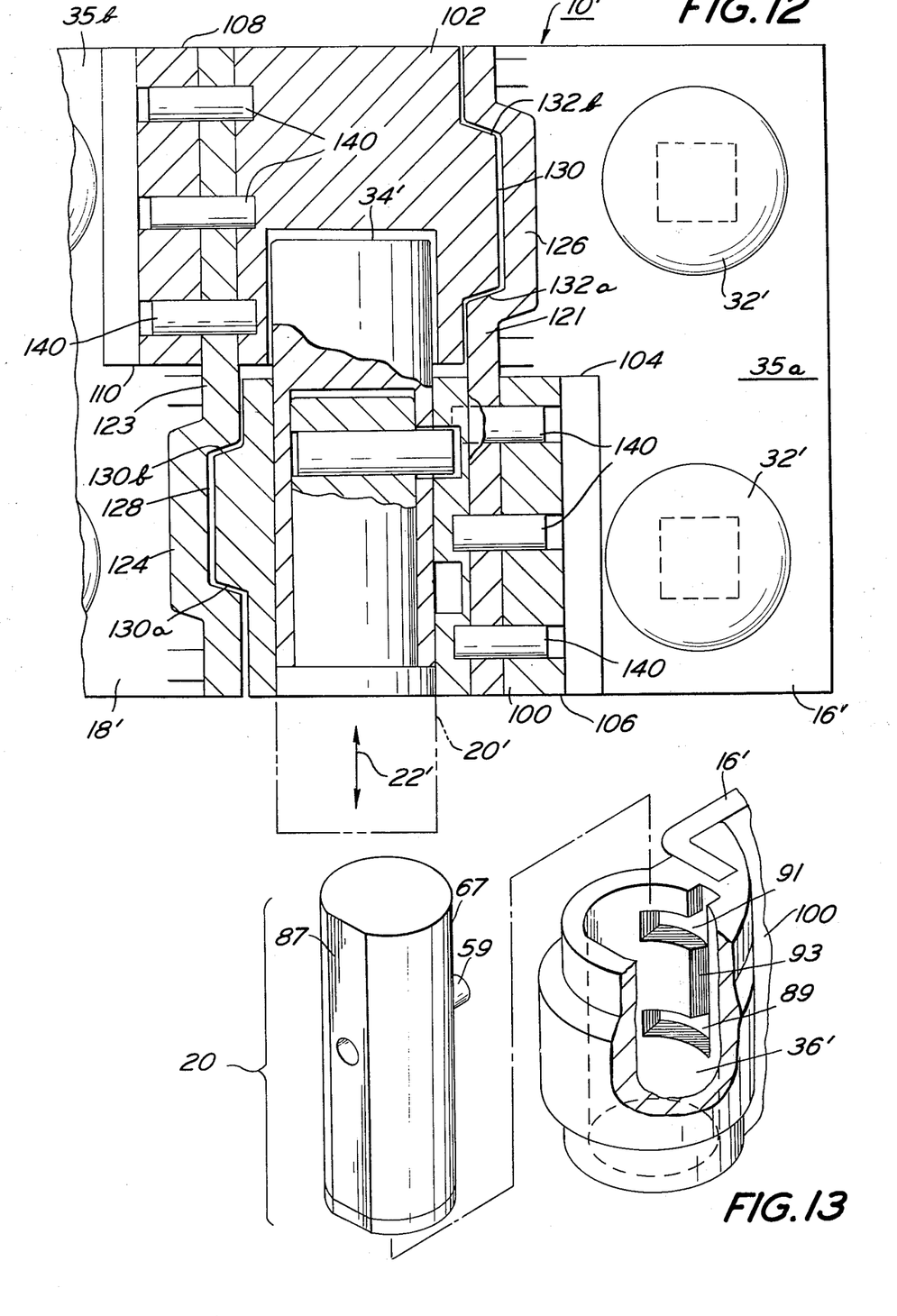

Bar lock mechanisms 20 and 20' shown in FIGS. 5, 6 and 13 respectively include locking pin 59 extending through a wall of tube 67 and moveably actuated in tube channel 61 by rotation of key 63 in a standard cylinder lock. Locking tube 67 is maintained in rotative constrainment within lugs 30 or 100 by flattened sidewall 87 which interfaces with a similar flat sidewall of the lug within which tube 67 is inserted. Locking is accomplished by rotating pin 59 into either first or second extension grooves 89, 91 respectively. When pin 59 is rotated into alignment with vertical groove 93, bar lock mechanism 20 or 20' may be moved in direction 22 to provide release of mating strike plate.

Figure 9:
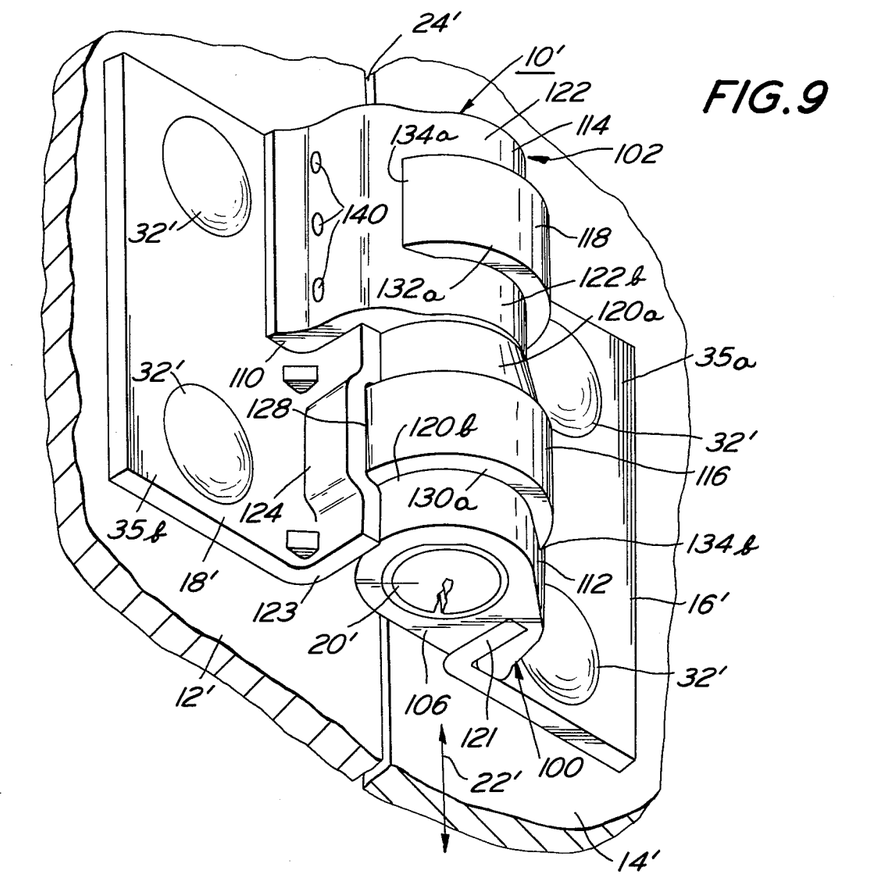
FIG. 9 is a perspective view of an embodiment of the bar lock assembly secured to a pair of door members.
Figure 11:
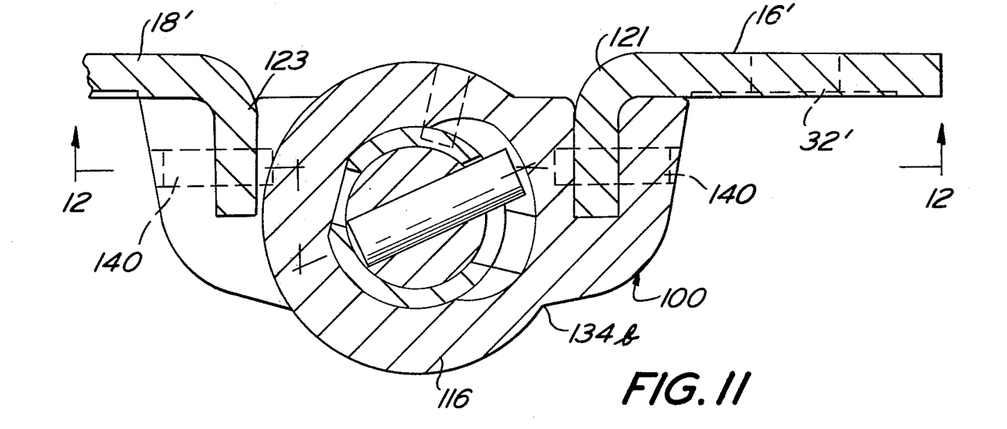
FIG. 11 is a sectional view of the bar lock assembly embodiment, partially cut-away and taken along the section line 11—11 of FIG. 10.

In the embodiment shown in FIGS. 9–13, there is shown another modified improved locking bar assembly 10' which includes a pair of strike plates 16', 18' secured rigidly to removable section elements or door members 12', 14' aligned with respect to each other along door interface area 24'. Strike plates 16', 18' are secured to members 12' and 14' by screws, bolts or some like device, through openings 32' as is shown in FIG. 9. Each of strike plates 16' and 18' include respective lug members 100 and 102 rigidly secured thereto. Lugs 100 and 102 are secured to strike plates 16' and 18' through screws, bolts or some like device. In actual practice, lugs 100, 102 have been successfully secured to strike plates 16', 18' by a plurality of "Drivlok" pins 140 which are hardened and driven through lugs 100, 102 and associated portions of plates 16', 18' to provide secured relation therebetween as shown in FIGS. 9 and 11. Bar lock mechanism 20' similar to lock mechanism 20 previously described, is insertable through bore openings 34' and 36' formed within each of lug members 100, 102 when they are aligned in a direction defined by directional arrow 22. In operation plates 16', 18' are mated each to the other in the inverted "L" shape contour common to lock assemblies of this nature. Lugs 100, 102 form the base section of the overall "L" shaped strike plates 16', 18' whereas frame sections 35a, 35b form the extended vertical section of the contour.

Each of lug members 100, 102 includes upper and lower surfaces 104, 106 and 108, 110 which are formed transverse of an axis direction of bores 34', 36'. Additionally, each of lug members 100 and 102 include associated outer surfaces 112 and 114 having at least one larger diameter section 116, 118 and smaller diameter sections 120a–b and 122a–b.

Strike plates 16' and 18' include first mating elements 124 and 126 which interface with extended diameter sections 116 and 118 as is shown in FIGS. 9 and 12. First mating elements 124, 126 may be formed as part of vertically extending strike plate wall members 121 and 123 which are formed in integral manner with a base plane surface of each of respective strike plates 16' and 18'. In each of first mating elements 124, 126, there is provided channel sections 128, 130 of substantially constant depth which extend throughout the normal extension of each of elements 124 and 126 from the base surfaces of plates 16' and 18'. Channels 128, 130 provide a depth substantially equal to the difference between the larger diameter sections 116 and 118 and associated smaller diameter sections 122a–b and 120a–b of lug members 30' and 28'. Thus, channels 128, 130 of first mating elements 124 and 126 receive the larger diameter sections 116, 118 of second mating elements formed by sections 120a–b, 116 and 118, 122a–b.

Larger diameter sections or tooth members 116, 118 have a substantially constant diameter throughout a portion of each lug 28', 30' peripheral boundary. Each of sections 116 and 118 include opposing sidewalls 130a–b, 132a–b which provide tooth depths substantially equal to but slightly less than the depth of channels 128, 130. Each of sections 116, 118 further form a substantially constant diameter throughout a peripheral portion of the outer surface boundary when taken with respect to axes of associated bores 34', 36'. This constant diameter extends through a portion of each of respective lugs 28' or 30' until channel demarcation lines 134a–b are reached. At this point, sections 116 and 118 are formed into a sidewall of respective lugs 100, 102. In this manner, it is seen that either of strike plates 16' or 18' are free to rotate with respect to each other through a portion of the total lug circumference when bores 34', 36' are aligned. This freedom of rotation extends to interface formation lines 134a–b where channel elements 124, 126 contact the sidewalls of each of lug members 100, 102. However, as is now clearly seen, although strike plates 16', 18' are free to rotate, they are constrained in the direction defined by directional arrow 22' as well as in partial constrainment in a rotative direction with respect to each other.

Assembly 10' is structurally the inverse to the basic tongue in groove concept developed in my copending patent application to be issued as U.S. Pat. No. 3,827,266. However, in this concept, lug members 100 and 102 are formed in separate construction with respect to strike plates 16' and 18' and secured thereto through pin members 140 as previously described. Additionally, the tongue or tooth elements 116, 118 are now formed on associated lug members 100, 102 and channel sections 128, 130 are formed on portions of strike plates 16', 18'.

This modified concept of the basic tongue in groove locking bar assembly has lowered fabrication cost by relieving problems in undercut sections which have become apparent in prior concepts. In general, structural integrity of assembly 10' is increased by fabricating bar lock mechanism 20' and strike plates 16' in wrought stainless steel. Further, members 100, 102 have been successfully formed of steel through investment casting or powdered metal techniques to provide low cost, structurally secure assemblies 10'.

What is claimed is:

1. A locking bar assembly comprising:
   a. a pair of strike plates, each of said strike plates having a respective lug member formed thereon;
   b. bar lock means insertable through bores formed within each of said lug members when said bores are aligned in a predetermined direction;
   c. each of said lug members having an upper and lower surface passing in a plane substantially normal to an axis direction of said bores, and an outer side surface having at least one larger dimension section and at least one smaller dimension section;
   d. at least one first mating means formed by at least one of said strike plates; and,
   e. at least one second mating means formed on and shorter than said outer side surface, said first mating means of one of said strike plates and said second mating means of said lug member of the other of said strike plates being received one in the other when said bores are aligned in said predetermined direction, said first and second mating means being formed to define at least one angular substantially fixed position between said strike plates.

2. The locking bar assembly as recited in claim 1 where said first and second mating means are received each within the other in said angularly fixed position when said strike plates are aligned each to the other in linear planar relation.

3. The locking bar assembly as recited in claim 1 where said first and second mating means form a tooth and accommodating channel received one within the other in said angularly fixed position when said strike plates are aligned each to the other in substantially perpendicular directions.

4. The locking bar assembly as recited in claim 1 where said larger dimension section and said smaller dimension section form a channel section extending throughout a portion of the periphery of a lug member.

5. The locking bar assembly as recited in claim 4 where said first mating means includes a tooth member having a substantially linear extended length for being received in said locked channel section of said lug member.

6. The locking bar assembly as recited in claim 5 where said channel section includes a base surface of substantially linear extension for interfacing with said tooth member.

7. The locking bar assembly in claim 5 in which said channel section is rectangularly contoured to form a substantially continuous contacting surface interface with respect to said tooth member thereby to reduce the possibility of insertion of a prying tool.

8. The locking bar assembly as recited in claim 7 in which said channel section is formed in at least three portions for receiving said tooth member in at least three of said angularly fixed positions.

9. The locking bar assembly as recited in claim 4 where said channel section is continuously formed within at least two sidewalls of said lug members, said sidewalls being substantially normal to each other.

10. The locking bar assembly as recited in claim 1 where said strike plates include planar rear surfaces, said first and second mating means being received each within the other for mounting said strike plates to moveable elements to be secured each to the other in a manner where said rear surfaces of said strike plates are continuously in contact with each of said moveable members.

11. A locking bar assembly comprising:
   a. a pair of strike plates, each of said strike plates having a respective lug member;
   b. bar lock means insertable through bores formed within each of said lug members when said bores are aligned in a predetermined direction;
   c. each of said lug members having an upper and lower surface and an outer side surface, said upper and lower surfaces formed transverse of said bore within said lug member, said outer side surface having at least one larger diameter section and at least one smaller diameter section;
   d. at least one first mating means forming a channel section in at least one of said strike plates; and,
   e. at least one second mating means formed on and shorter than said outer side surface of at least one of said lug members, said channel section of said first mating means receiving said larger diameter section of said second mating means of said lug member when said bores are aligned in said predetermined direction.

12. The locking bar assembly as recited in claim 11 where said second mating means includes a tooth member insertable within a corresponding one of said first mating means for restraining motion of said strike plates in said predetermined direction.

13. The locking bar assembly as recited in claim 12 where said first mating means includes means for permitting rotation of one of said strike plates with respect to the other of said strike plates when said second mating means is inserted in said first mating means.

14. The locking bar assembly as recited in claim 12 where said tooth member is of substantially constant diameter throughout a predetermined portion of the periphery of each of said lug members.

15. The locking bar assembly as recited in claim 14 where each of said tooth elements and said channels include inclined sidewalls for increasing load bearing contact areas.

* * * * *